United States Patent
Kostadinov et al.

(10) Patent No.: US 9,946,868 B2
(45) Date of Patent: Apr. 17, 2018

(54) DEVICE FUNCTIONALITY CONTROL

(71) Applicant: Dresser, Inc., Houston, TX (US)

(72) Inventors: Vladimir Dimitrov Kostadinov, Sharon, MA (US); Xiaoping Jiang, Shanghai (CN); Min Huang, Shanghai District (CN)

(73) Assignee: Dresser, Inc., Addison, TX (US)

( * ) Notice: Subject to any disclaimer, the term of this patent is extended or adjusted under 35 U.S.C. 154(b) by 150 days.

(21) Appl. No.: 14/881,087

(22) Filed: Oct. 12, 2015

(65) Prior Publication Data

US 2017/0103198 A1    Apr. 13, 2017

(51) Int. Cl.
| | | |
|---|---|---|
| *G06F 7/04* | (2006.01) | |
| *G06F 12/00* | (2006.01) | |
| *G06F 12/14* | (2006.01) | |
| *G06F 13/00* | (2006.01) | |
| *G06F 17/30* | (2006.01) | |
| *G11C 7/00* | (2006.01) | |
| *G06F 21/45* | (2013.01) | |
| *G06F 21/31* | (2013.01) | |
| *G06F 21/60* | (2013.01) | |
| *G06F 21/62* | (2013.01) | |

(52) U.S. Cl.
CPC .............. *G06F 21/45* (2013.01); *G06F 21/31* (2013.01); *G06F 21/604* (2013.01); *G06F 21/629* (2013.01); *G06F 21/6218* (2013.01)

(58) Field of Classification Search
CPC ....... G06F 21/45; G06F 21/604; G06F 21/629
USPC ..................................... 726/17, 18
See application file for complete search history.

(56) References Cited

U.S. PATENT DOCUMENTS

| | | |
|---|---|---|
| 6,618,630 B1 | 9/2003 | Jundt et al. |
| 7,263,546 B1 | 8/2007 | Kostadinov |
| 7,810,152 B2 * | 10/2010 | Carr ...................... G11C 16/22 713/166 |

(Continued)

FOREIGN PATENT DOCUMENTS

WO        2007128544 A1    11/2007

OTHER PUBLICATIONS

International Search Report and Written Opinion issued in connection with corresponding PCT Application No. PCT/US2016/049620 dated Nov. 24, 2016.

*Primary Examiner* — Eleni Shiferaw
*Assistant Examiner* — Khalil Naghdali
(74) *Attorney, Agent, or Firm* — Paul Frank + Collins P.C.

(57) ABSTRACT

A system and associated method for controlling access to features of a device are provided. The system includes a feature access component that maintains an access control register configured to store an access control parameter indicating whether a user has access to a feature of the device. Responsive to receiving a request to modify the access control register to enable or disable access to the feature, an access authentication parameter is set to an authentication key of the request and an access parameter is set to a value of the request (e.g., 1 "Enable"). The access authentication parameter and access parameter are evaluated utilizing an authentication algorithm. Responsive to successfully authenticating the request, the access control register is modified based upon the value of the access parameter, such as to indicate that the user is now authorized to read and/or modify a parameter and/or invoke a service to execute.

14 Claims, 14 Drawing Sheets

(56) References Cited

U.S. PATENT DOCUMENTS

| | | | |
|---|---|---|---|
| 8,122,434 B2 | 2/2012 | Kostadinov et al. | |
| 8,127,060 B2 | 2/2012 | Doll et al. | |
| 8,464,168 B2 | 6/2013 | Bump et al. | |
| 8,478,979 B2 * | 7/2013 | Hodge | G06F 15/177 455/411 |
| 8,578,161 B2 | 11/2013 | Smith et al. | |
| 9,047,458 B2 * | 6/2015 | Etchegoyen | G06F 21/31 |
| 9,638,344 B2 * | 5/2017 | Nieters | F16K 31/12 |
| 2004/0215934 A1 * | 10/2004 | Yoaz | G06F 9/30134 712/202 |
| 2007/0260836 A1 * | 11/2007 | Rudelic | G06F 12/1441 711/163 |
| 2008/0244369 A1 * | 10/2008 | Jiang | G06F 11/1032 714/800 |
| 2008/0282332 A1 | 11/2008 | Jurisch | |
| 2010/0071059 A1 * | 3/2010 | Urasawa | G06F 21/31 726/19 |
| 2010/0204976 A1 * | 8/2010 | Amano | G06F 11/261 703/25 |
| 2010/0315198 A1 | 12/2010 | Jurisch | |
| 2011/0004685 A1 | 1/2011 | De Groot et al. | |
| 2011/0066297 A1 * | 3/2011 | Saberi | F16K 31/046 700/287 |
| 2011/0107157 A1 | 5/2011 | Okamoto et al. | |
| 2014/0067091 A1 | 3/2014 | Vishwanath et al. | |
| 2014/0358304 A1 * | 12/2014 | Muir | G05D 16/2053 700/283 |
| 2014/0380060 A1 * | 12/2014 | Ganguly | G06F 21/31 713/186 |
| 2015/0310460 A1 * | 10/2015 | Tesanovic | G06Q 30/0201 705/7.31 |
| 2016/0183107 A1 * | 6/2016 | Hammann | H04W 24/04 370/241 |
| 2016/0275450 A1 * | 9/2016 | Chang | G06Q 10/0836 |

* cited by examiner

DEVICE FUNCTIONALITY CONTROL

BACKGROUND OF THE INVENTION

Many industries, such as an oil industry, a nuclear power industry, etc., employ devices such as valves, sensors, control devices, actuators, and/or a variety of other equipment for operation. A device may maintain various parameters, such as measurement values (e.g., a temperature measurement, a pressure measurement, etc.), device status (e.g., a closed status of a valve), set points, device identification information (e.g., device type, manufacturer, serial number, order number, date of manufacture, etc.), etc. A user may utilize a local user interface and/or a fieldbus interface to read and/or modify parameters (e.g., read a temperature, set a pressure, etc.). The device may provide access to a service that may be executed by the user (e.g., a diagnostic service). The device may provide basic functionality (e.g., access to the pressure measurement), and the user may pay for additional functionality (e.g., access to the temperature measurement, the diagnostic service, etc.). Individually customizing devices during manufacture may be inefficient and/or result in additional costs or slowdowns in manufacturing. Thus, it would be useful to enable and/or disable features of a device without susceptibility to unauthorized access to features.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject matter relates to features of devices, and more particularly relates to enabling or disabling access to features, such as parameters, data and/or services, of devices.

In accordance with one aspect, the disclosed subject matter provides a system for controlling access to features of a device. The system includes a feature access component. The feature access component is configured to maintain an access control register configured to store an access control parameter indicating whether a user has access to a feature of the device. The feature access component is configured to receive a request to modify the access control register to enable or disable access to the feature. The request includes an authentication key used to set an access authentication parameter and a value used to set an access parameter. The feature access component is configured to evaluate the access authentication parameter and the access parameter utilizing an authentication algorithm for either authenticating the request or not authenticating the request. The feature access component is configured to modify the access control register based upon the value of the access parameter to enable or disable the feature responsive to successfully authenticating the request.

In accordance with another aspect, the disclosed subject matter provides a method for controlling access to features of a device. The method includes receiving a request to modify an access control register to enable or disable access to a feature of a device. The request includes an authentication key used to set an access authentication parameter and a value used to set an access parameter. The method includes evaluating the access authentication parameter and the access parameter utilizing an authentication algorithm for either authenticating the request or not authenticating the request. The method includes modifying the access control register based upon the value of the access parameter to enable or disable the feature responsive to successfully authenticating the request.

In accordance with yet another aspect, the disclosed subject matter provides a device. The device includes a service configured to execute based upon a service access control parameter indicating that a user has access to invoke the service. The device includes a device parameter accessible for reading by the user based upon a read access control parameter indicating that the user has access to read the device parameter. The device parameter is accessible for modifying based upon a modify access control parameter indicating that the user has access to modify the device parameter. The device includes a feature access component configured to receive a request to modify an access control register, associated with at least one of the service or the device parameter, to enable or disable access to a feature of the device. The request includes an authentication key used to set an access authentication parameter and a value used to set an access parameter. The feature access component is configured to evaluate the access authentication parameter and the access parameter utilizing an authentication algorithm for either authenticating the request or not authenticating the request. The feature access component is configured to modify the access control register based upon the value of the access parameter to enable or disable the feature responsive to successfully authenticating the request.

BRIEF DESCRIPTION OF THE DRAWINGS

The foregoing and other aspects of the disclosed subject matter will become apparent to those skilled in the art to which the disclosed subject matter relates upon reading the following description with reference to the accompanying drawings, in which.

DETAILED DESCRIPTION OF THE INVENTION

Figure 1:
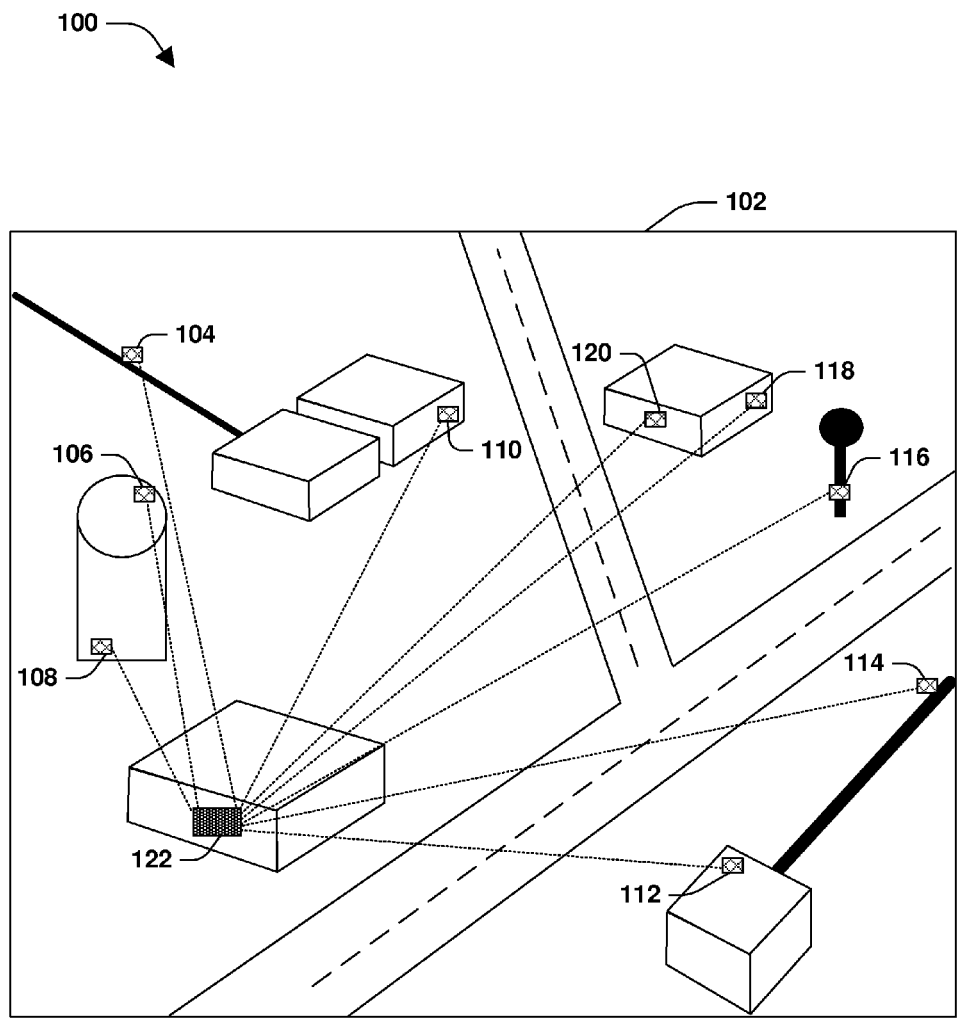
FIG. 1 is a schematic representation of an example of an industrial plant for which secure communication may be provided.

Example embodiments that incorporate one or more aspects of the disclosed subject matter are described and illustrated in the drawings. These illustrated examples are not intended to be a limitation on the disclosed subject matter. For example, one or more aspects of the disclosed subject matter can be utilized in other embodiments and even other types of devices. Moreover, certain terminology is used herein for convenience only and is not to be taken as a limitation on the disclosed subject matter. Still further, in the drawings, the same reference numerals are employed for designating the same elements.

Embodiments of the disclosed subject matter provide techniques for controlling access to features of a device. For example, an oil refinery may include a monitoring device with features that can monitor temperature, pressure, and flow rate of oil through an oil refining machine. Some of the features, such as monitoring temperature, may be initially enabled for the monitoring device, while other features, such as monitoring pressure and flow rate, may be available for purchase. As described more fully below, some embodiments of the disclosed subject matter relate to enabling such features of devices in a secure manner, such as through authentication. In this way, the oil refinery may purchase and enable features of the monitoring devices that may otherwise be initially unavailable. Other embodiments are within the scope of the disclosed subject matter.

FIG. 1 schematically illustrates an example setting/environment 100 of an industrial plant 102 for which device feature access may be provided in accordance with at least one aspect of the disclosed subject matter. The industrial plant 102 may employ a large multitude of devices, such as valves, actuators, temperature sensors, flow rate monitors, pipe transportation devices, oil refining machinery, and/or other devices that may be communicatively coupled by communication connection lines with a distributed control system 122. For example, the distributed control system 122 may be communicatively coupled to a first device 104 located along a first pipe, a second device 106 and a third device 108 located within a holding tank, a fourth device 110 located within a storage building, a fifth device 112 located within a distribution building, a sixth device 114 located along a second pipe, a seventh device 116 located on a control signal tower, an eighth device 118 and a ninth device 120 located within an oil refining building, and/or other devices. It is to be appreciated that communicatively coupled can be by any suitable construction/configuration such as wired, wireless (e.g., RF broadcast, IR line of sight, optical line of sight), fiber optic, satellite, etc. Specifics of concerning communicatively coupled need not be specific limitation upon the disclosed subject matter.

The distributed control system 122 may send control signals to and/or collect data from such devices. For example, the distributed control system 122 may receive a temperature measurement from a temperature sensor. In another example, the distributed control system 122 may send a control signal to a gas valve to open to a certain position (e.g., a halfway open condition) based upon the temperature measurement. As provided herein, access to parameters (e.g., a temperature measurement parameter, a pressure measurement parameter, etc.) and/or services (e.g., a diagnostic service) of a device may be controlled based upon access control registers and/or authentication registers used to verify whether a user has authorization to access such features. The user may be authenticated or not authenticated for changing access to such features. For example, the user may purchase an authentication key that may be used to enable access to a diagnostic service of a device otherwise not accessible to the user.

FIGS. 2A-2E schematically illustrate examples of a system 200 for controlling access to features of a device 201, such as the devices in FIG. 1 that are part of the industrial plant 102 and/or may be other, non-shown devices. The device 201 (e.g., a pressure valve) may offer access to basic features, such as a basic device parameter 204 (e.g., a valve position measurement) and/or a basic service 206 (e.g., a valve recalibration service), which may be accessible through a communication interface (e.g., a fieldbus communication interface 218) of a fieldbus 202. The device 201 may offer access to additional features that may be available to purchase, such as a first device parameter 208 (e.g., a temperature measurement), a second device parameter 210, a third device parameter 212, a first service 214 (e.g., a diagnostic service), a second service 216 (e.g., a diagnostic interpretation and lifespan prediction service), and/or other features exposed through device parameters 264 of FIG. 2D.

Figure 2A:
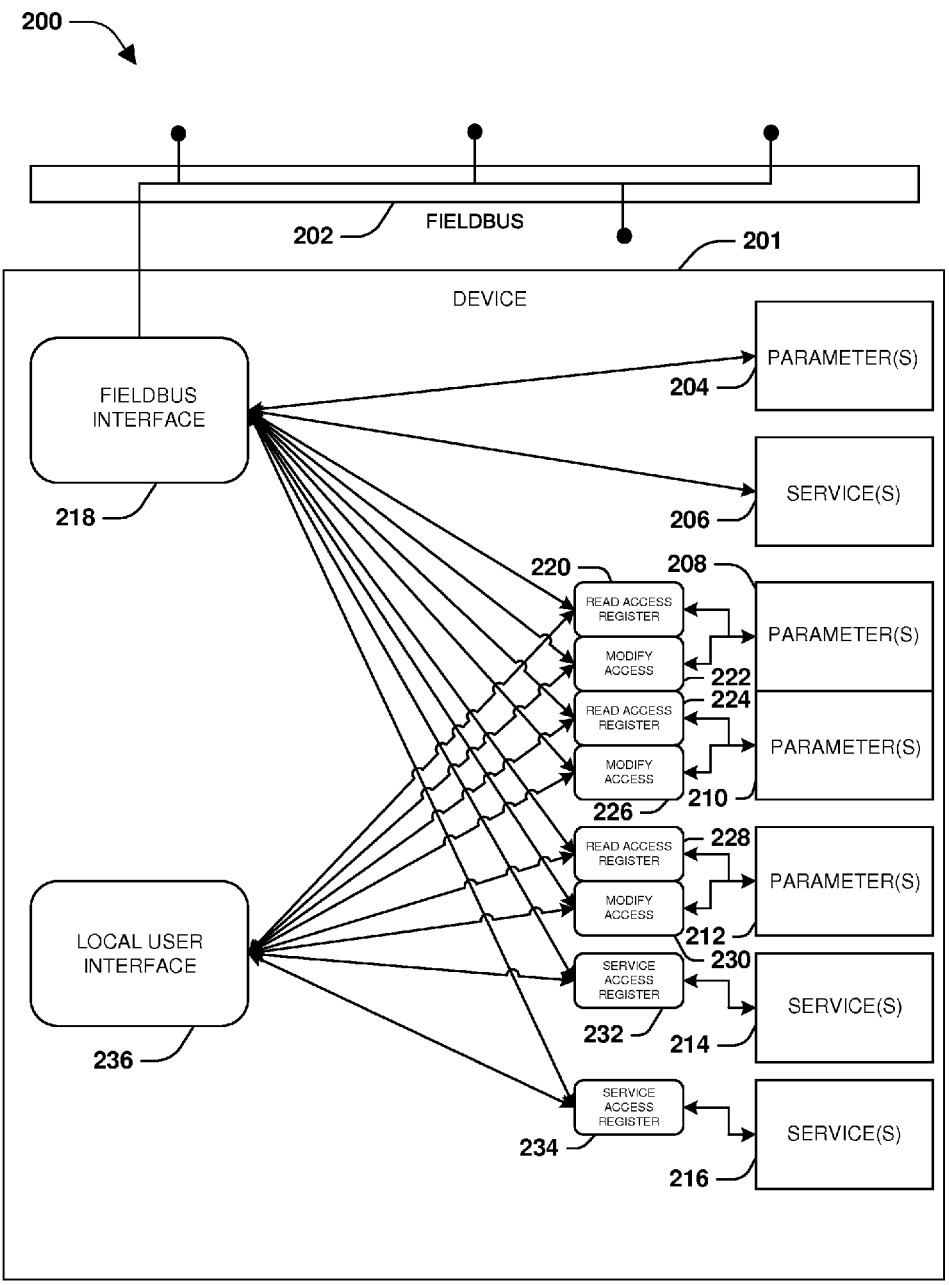
FIG. 2A is a schematic representation of an example of a system for controlling access to features of a device connected to a fieldbus.
Figure 2B:
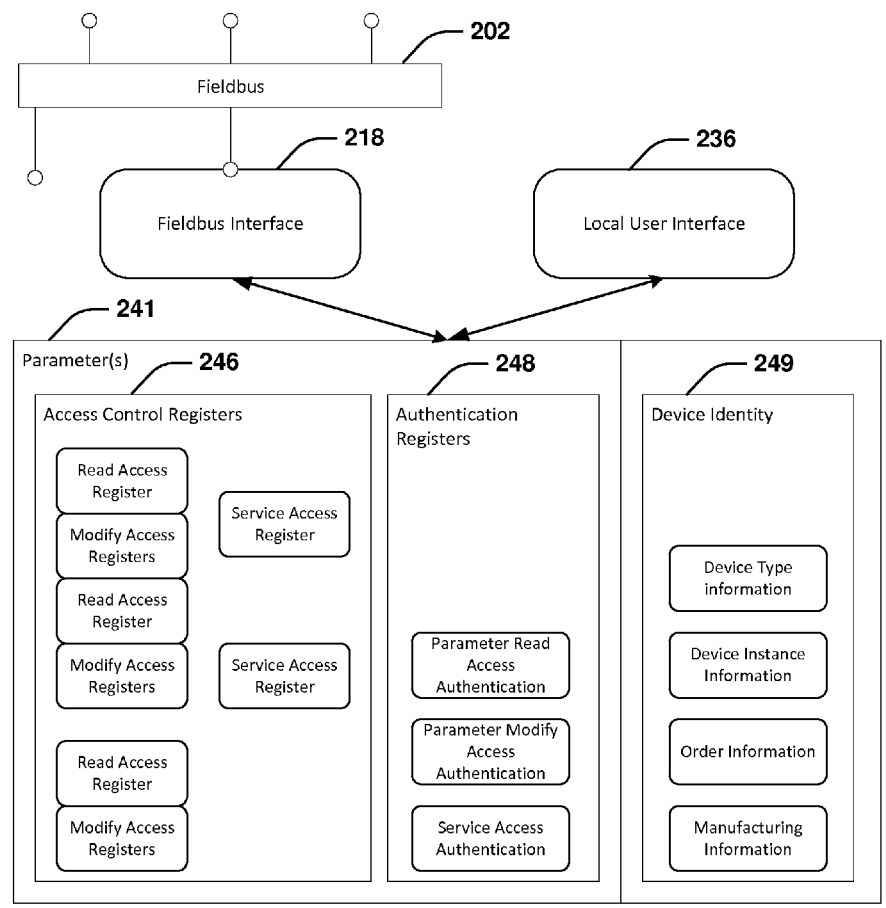
FIG. 2B is a schematic representation of an example of a system for controlling access to features of a device connected to a fieldbus.
Figure 2C:
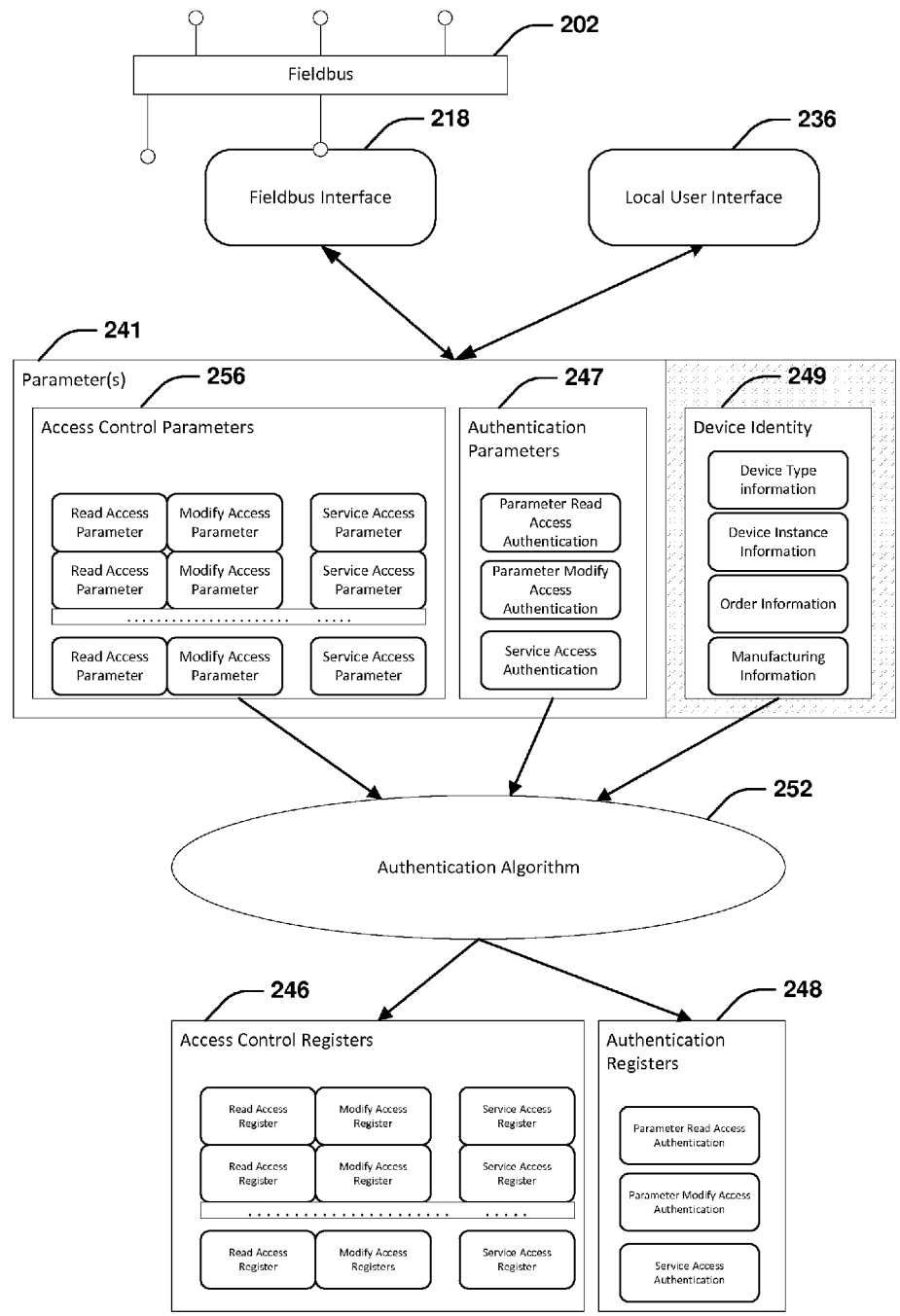
FIG. 2C is a schematic representation of an example of a system for controlling access to features of a device using an authentication algorithm.

Values of registers, such as Boolean values within access control registers 246 of FIG. 2B, may indicate whether the user has access to enable or disable a corresponding feature. Values within a first read access control register 220 and a first modify access control register 222 may indicate whether the user has authorization to read and/or modify the first device parameter 208. Values within a second read access control register 224 and a second modify access control register 226 may indicate whether the user has authorization to access the second device parameter 210. Values within a third read access control register 228 and a third modify access control register 230 may indicate whether the user has authorization to access the third device parameter 212. A value of a first service access control register 232 may indicate whether the user has authorization to access the first service 214. A value of a second service access control register 234 may indicate whether the user has authorization to access the second service 216.

Figure 2D:
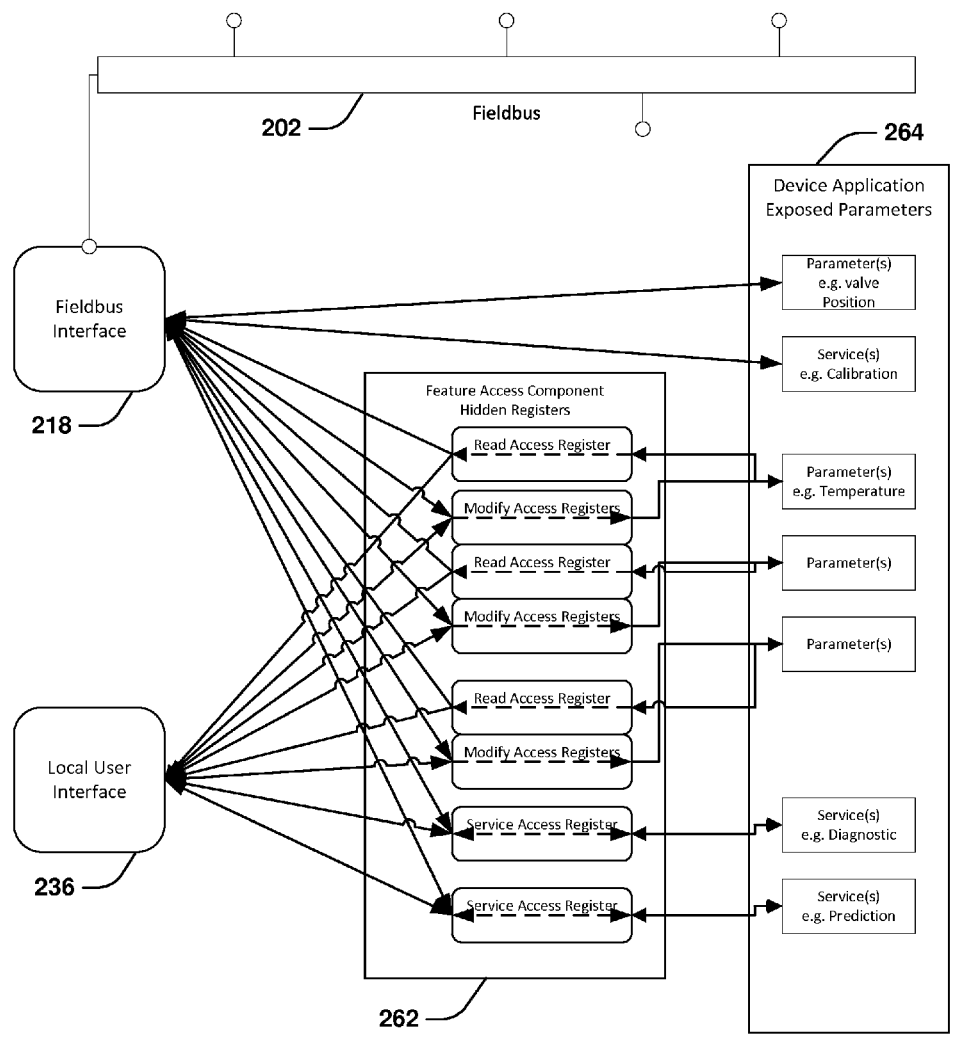
FIG. 2D is a schematic representation of an example of a system for controlling access to features of a device connected to a fieldbus through access registers.
Figure 2E:
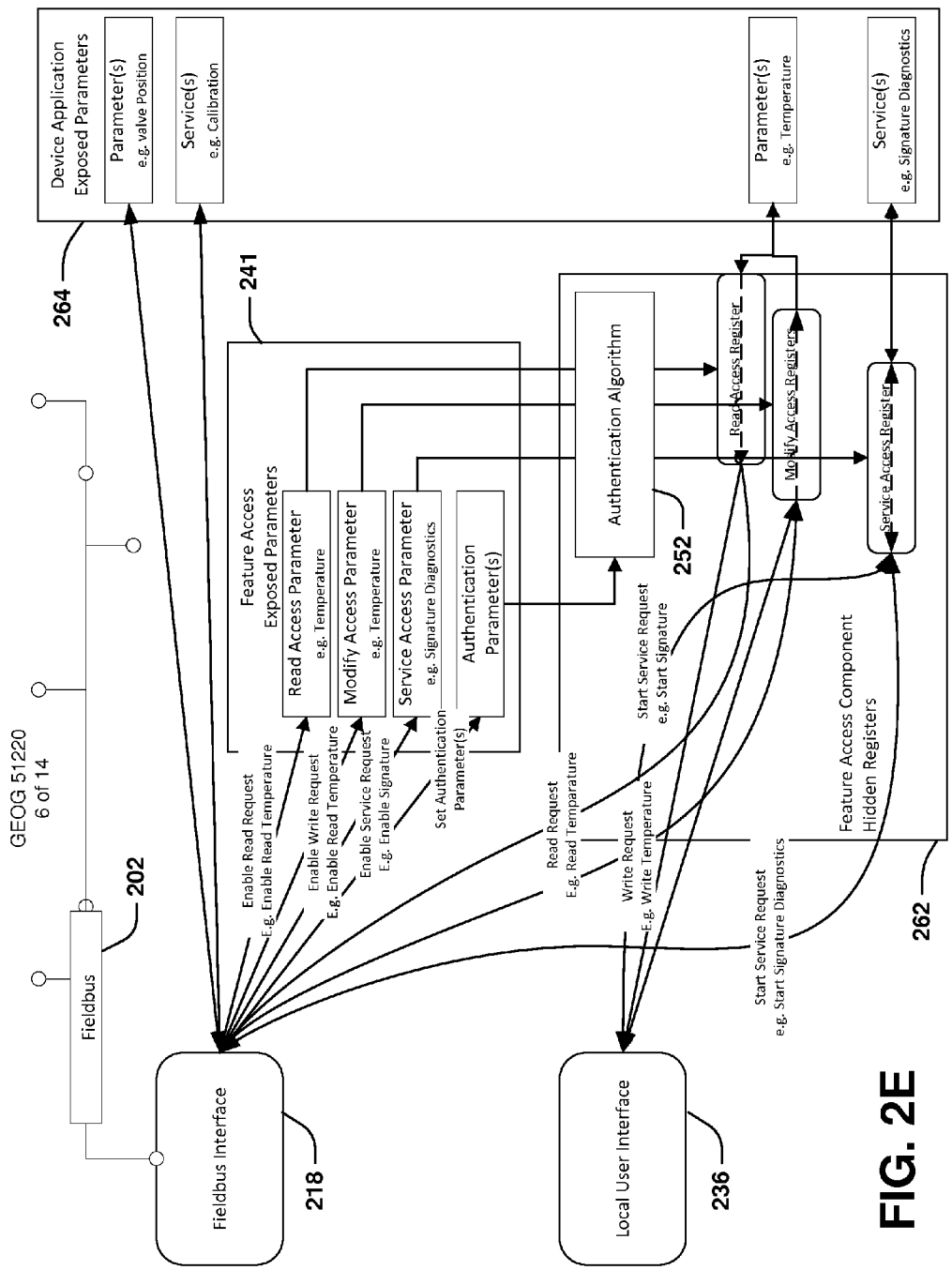
FIG. 2E is a schematic representation of an example of a system for controlling access to features of a device connected to a fieldbus.

By modifying values associated with a feature access component 262 of FIG. 2D, such as read access registers, write access registers and service access registers (e.g., access control registers 246), the user may gain access to the parameters and services, such as the device parameters 264 of FIG. 2D and FIG. 2E, for enablement or disablement (e.g., read and/or write access to a valve position parameter, a calibration parameter, a temperature parameter, a diagnostic parameter, a prediction parameter, etc.). The registers, such as the access control registers 246 and/or authentication registers 248, in the feature access component 262 are typically not directly exposed to the user and access to the registers can be controlled by the authentication algorithm 252 of FIG. 2C in the feature access component 262. The user may attempt to modify the access control registers 246 through their proxy access control parameters 256—read access parameters, modify access parameters, and service access parameter. The user may attempt to authenticate with the feature access component 262 for authorization to modify a value within an access control register 246 in order to gain access to features and/or services not already accessible. For example, the first read access control register 220 and the first modify access control register 222 may include values, such as 0 ("Disable"), indicating that the user does not have access to read and/or modify the first device parameter 208 (e.g., the temperature measurement).

The user may submit a request, through the fieldbus communication interface 218 or the local user interface 236 to exposed parameters 241 (e.g. read or modify access parameter) to modify the values within the first read access control register 220 and the first modify access control register 222. The same or different request may include an authentication key used to set the values of the read or modify access authentication parameters 247 and enable the modification of the access control registers 246 (e.g., the user may have purchased the authentication key for unlocking the feature of reading from and modifying/writing to the temperature measurement). The request may include a value used to set an access parameter (e.g., a 1 ("Enable") value). The authentication parameter 247, set to the authentication key and corresponding to the authentication register 248, and the access parameter may be evaluated utilizing the authentication algorithm 252 for either authenticating or not authenticating the request to change an access control register to the value of the access parameter (e.g., a signature or key verification or any other verification technique may be performed on the authentication key set within the access authentication parameter).

Responsive to successfully authenticating the request and/or device identify information 249, the values of the first read access control register 220 and the first modify access control register 222 may be changed from 0 ("Disable") to 1 ("Enable") to indicate that the user now has access to read and modify the first device parameter 208 (e.g., access to read from and/or write to the first device parameter 208). Responsive to unsuccessfully authenticating the request (e.g., the verification technique may be unable to verify the authenticity of the request), the first read access control register 220 and the first modify access control register 222 may retain the value of 0 ("Disable") indicating that the user does not have read or modify access to the first device parameter 208. Similarly, the user may attempt to authenticate with the feature access component 262 for modifying values within read access control registers, modify access control registers, and/or service access control registers for enabling features.

Figure 3:
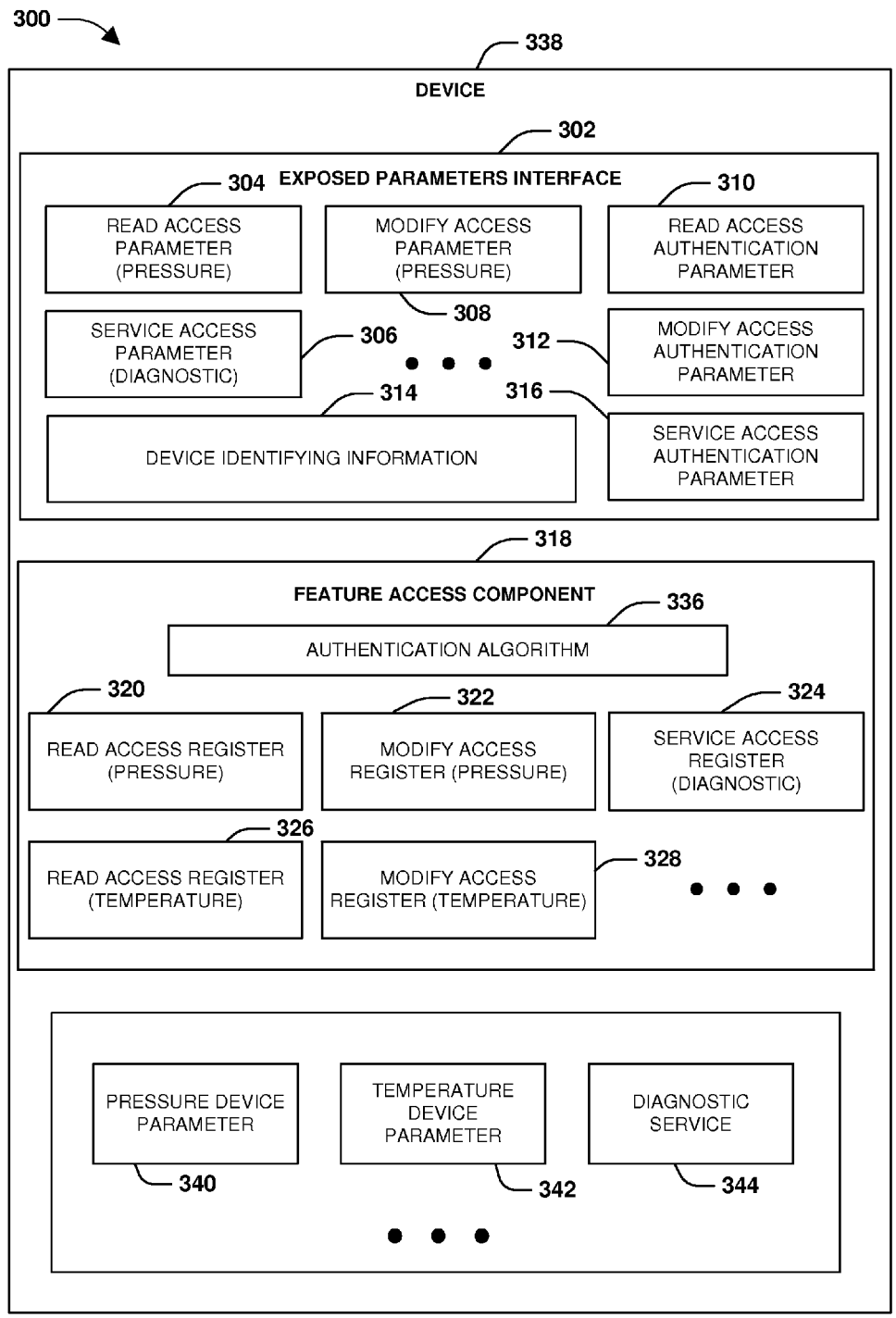
FIG. 3 is a schematic representation of an example of a system for controlling access to features of a device.

FIG. 3 schematically illustrates an example of a system 300 for controlling access to features of a device application of a device 338, such as the devices in FIG. 1 that are part of the industrial plant 102 and/or may be other, non-shown devices. The system 300 may include a feature access component 318 associated with the device application of the device 338, such as a valve application, an actuator application, a sensor application, or any other industrial device application. The device application of the device 338 may maintain one or more device parameters that may be accessible for reading by a user based upon read access control parameters indicating that the user has access to read the device parameters. The one or more device parameters may be accessible for modifying by the user based upon modify access control parameters indicating that the user has access to modify the device parameters. For example, the device application of the device 338 may maintain a pressure device parameter 340 within which the device 338 may store pressure measurements/values. The device application of the device 338 may maintain a temperature device parameter 342 within which the device 338 may store temperature measurements/values. The device application of the device 338 may maintain one or more services configured to execute based upon service access control parameters indicating that the user has access to invoke the services. For example, the device application of the device 338 may host a diagnostic service 344 that may be invoked by the user.

The feature access component 318 may maintain one or more access control registers, configured to store access control parameters indicating whether the user has access to a feature of the device 338. For example, the feature access component 318 may maintain a read access control register (pressure) 320 configured to store a read access control parameter (pressure) whose value indicates whether the user has access to read the pressure device parameter 340. The feature access component 318 may maintain a modify access control register (pressure) 322 configured to store a modify access control parameter (pressure) whose value indicates whether the user has access to modify the pressure device parameter 340. The feature access component 318 may maintain a read access control register (temperature) 326 configured to store a read access control parameter (temperature) whose value indicates whether the user has access to read the temperature device parameter 342. The feature access component 318 may maintain a modify access control register (temperature) 328 configured to store a modify access control parameter (temperature) whose value indicates whether the user has access to modify the temperature device parameter 342. The feature access component 318 may maintain a service access control register (diagnostic) 324 configured to store a service access control parameter (diagnostic) whose value indicates whether the user has access to invoke the diagnostic service 344 of the device 338.

An exposed parameters interface 302 may expose one or more access authentication parameters used to determine the validity of a request to modify a value of an access control parameter. For example, the exposed parameters interface 302 may expose a read access authentication parameter 310 that may be set to a value of an authentication key, and the read access authentication parameter 310 may be evaluated to determine a validity of a request to enable or disable a feature for reading a device parameter. The exposed parameters interface 302 may expose a modify access authentication parameter 312 that may be set of a value of an authentication key, and the modify access authentication parameter 312 may be evaluated to determine a validity of a request to enable or disable a feature for modifying (e.g., writing to) a device parameter. The exposed parameters interface 302 expose a service access authentication parameter 316 that may be set to a value of an authentication key, and the service access authentication parameter 316 may be evaluated to determine a validity of a request to modify a value within a service access control register to enable or disable a feature of invoking a service (e.g., modify a value within the service access control register (diagnostic) 324 to enable access to invoke the diagnostic service 344). In an example, the exposed parameters interface 302 may expose the read access authentication parameter 310, the modify access authentication parameter 312, and/or the service access authentication parameter 316 as exposed parameters to a user so that the user may write values, such as authentication keys, into such access authentication parameters for validity verification. It may be appreciated that any number of access parameters may be exposed (e.g., a single access authentication parameter may be used to verify requests to change various access control registers). In an example, the exposed parameters interface 302 may expose a read access parameter (pressure) 304, a modify access parameter (pressure) 308, and/or a service access parameter (diagnostic) 306 as exposed parameters to the user so that the user may write values into such access parameters for validity verification (e.g., values that the user desires to write into the access control registers).

In an example, an authentication algorithm 336 may receive (e.g., receipt through the fieldbus communication interface 218 or local user interface 236 of FIG. 2) a request to modify an access control register to enable or disable access to a feature. For example, the request may request to change a value of the modify access control register (temperature) 328 from 0 ("Disable") to 1 ("Enable") in order to enable writing to the temperature device parameter 342. The request may include an authentication key (e.g., a key purchased by the user in order to enable writing to the temperature device parameter 342) specially designed for that particular device 338 identified by device identifying information 314 (e.g., a device type, a device manufacturer, a serial number, device purchase order, a date of manufacture, and/or other information relating to the device type or device 338). The authentication key may be used to set the modify access authentication parameter 312. The request may include a value (e.g., a value that the user desires to write to the modified access control register (temperature) 328 such as a value of 1 ("Enable")) used to set a modify access parameter (temperature) of the exposed parameters.

The authentication algorithm 336 in the feature access component 318 may evaluate the modify access authentication parameter 312 set to the authentication key, the modify access control parameter (temperature) set to the value that the user desires to write to the modify access control register (temperature) 328, and/or the device identifying information 314 to determine the validity of the request to modify a value of the modify access control register (temperature) 328 to the value of the modify access control parameter (temperature) (e.g., the value of 1 ("Enable")). For example, if the modify access authentication parameter 312 matches an authentication code or is verified by a verification technique (e.g., a signature or key verification corresponding to the value of the modify access control parameter (temperature)), then the request may be authenticated. Responsive to successfully authenticating the request, the value of the modify access control register (temperature) 328 may be changed from 0 ("Disable") to 1 ("Enable") to enable writing to the temperature device parameter 342. In an example, the modification to the modify access control register (temperature) 328 may be applied to a device instance of the device 338 (e.g., if device instance information is used from the device identifying information 314), to devices of a device manufacture of the device 338 (e.g., if merely device manufacturer information is used from the device identifying information 314), to devices of a device type of the device 338 (e.g., if device type information is used from the device identifying information 314), or to devices of a device purchase order including the device 338 based upon the device identifying information 314. Responsive to not successfully authenticating the request, an unsuccessfully status and/or a substitute value (e.g., a substitute value or incorrect value may be returned when attempting to write to the temperature device parameter 342) may be provided, and the access control registers of the feature access component 318 will not be changed and/or may be disabled.

Figure 4A:
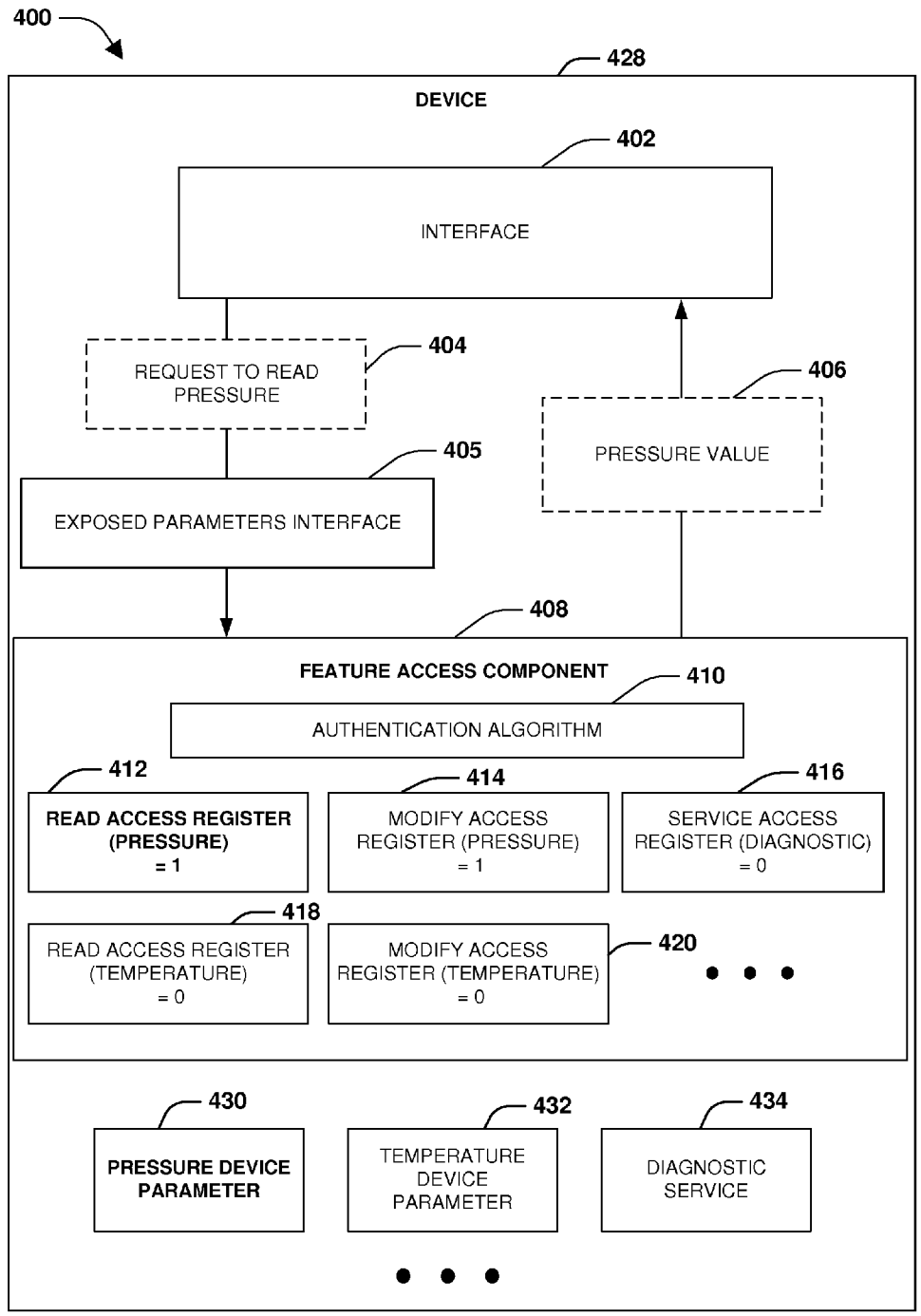
FIG. 4A is a schematic representation of an example of a system for controlling access to features of a device, where a pressure device parameter is read from the device.

FIGS. 4A-4F schematically illustrate examples of a system 400 for controlling access to features of a device 428, such as the devices in FIG. 1 that are part of the industrial plant 102 and/or may be other, non-shown devices. FIG. 4A illustrates the system 400 including a feature access component 408. The feature access component 408 may maintain a read access control register (pressure) 412 and a modify access control register (pressure) 414 for a pressure device parameter 430 of the device 428. The read access control register (pressure) 412 and the modify access control register (pressure) 414 may have access control parameters (e.g., a value of 1 "Enable") indicating that the user has access to read and modify the pressure device parameter 430. The feature access component 408 may maintain a read access control register (temperature) 418 and a modify access control register (temperature) 420 for a temperature deceive parameter 432 of the device 428. The read access control register (temperature) 418 and the modify access control register (temperature) 420 may have access control parameters (e.g., a value of 0 "Disable") indicating that the user does not have access to read and modify the temperature deceive parameter 432. The feature access component 408 may maintain a service access control register (diagnostic) 416 for a diagnostic service 434 of the device 428. The service access control register (diagnostic) 416 may have a service access control parameter (e.g., a value of 0 "Disable") indicating that the user does not have access to invoke the diagnostic service 434.

In an example, a request 404 to read the pressure device parameter 430 may be received from an interface 402 of the device 428 (e.g., the request 404 may be received through an exposed parameter(s) interface 405). The feature access component 408 may evaluate the read access control register (pressure) 412 to determine that a read access control parameter (pressure) (e.g., the value of 1) indicates that the user has authorization to read the pressure device parameter 430. Accordingly, the device 428 may return a pressure value 406 of the pressure device parameter 430 to the user, such as through the feature access component 408 and/or the interface 402.

Figure 4B:
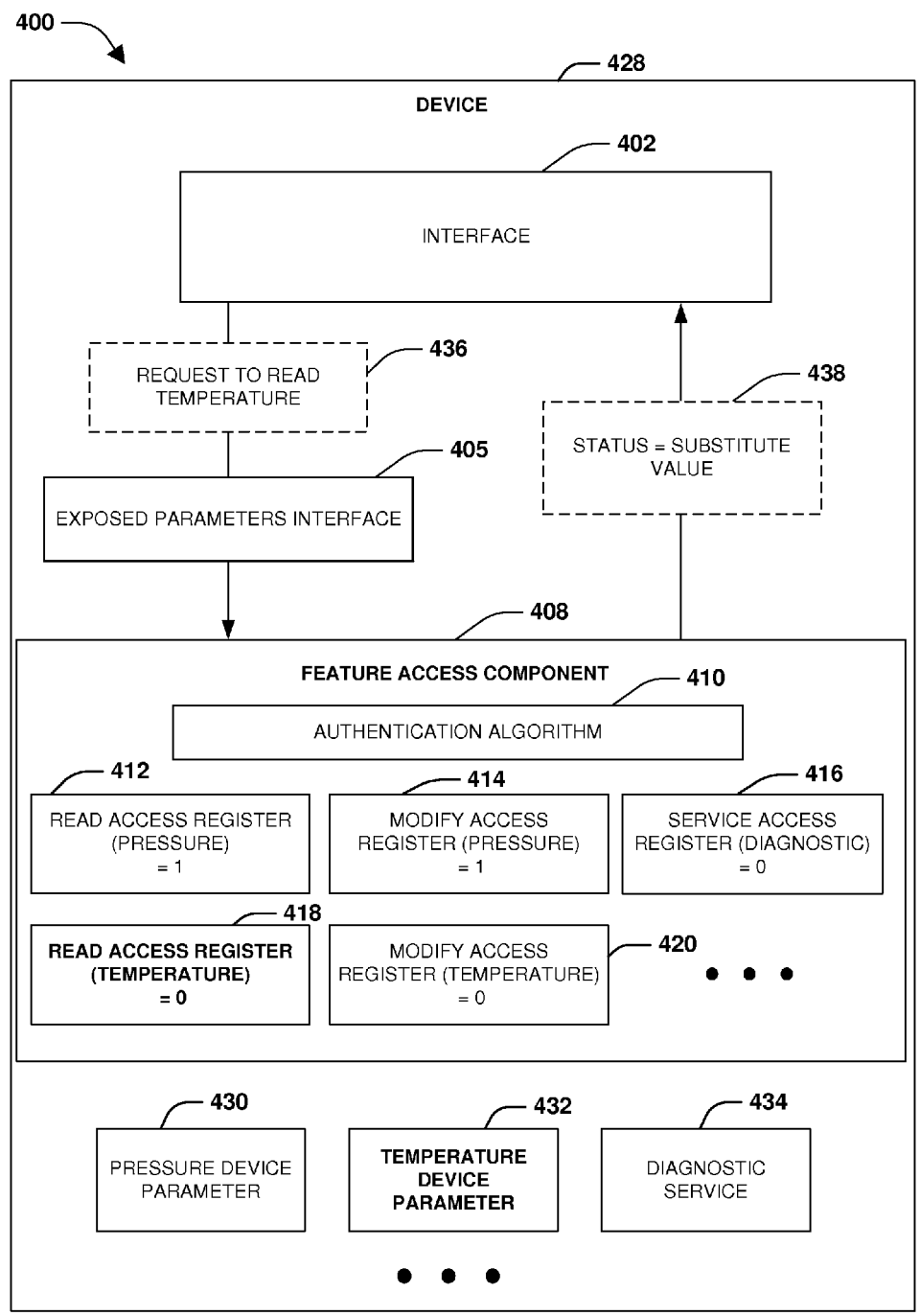
FIG. 4B is a schematic representation of an example of a system for controlling access to features of a device, where access to read a temperature device parameter is denied.

FIG. 4B illustrates an example of receiving a request 436, to read the temperature device parameter 432, from the interface 402 (e.g., the request 436 may be received through the exposed parameter interface 405). The feature access component 408 may evaluate the read access control register (temperature) 418 to determine that a read access control parameter (temperature) (e.g., the value of 0 "Disable") indicates that the user does not have authorization to read the temperature device parameter 432. Accordingly, the device 428 may return a substitute value 438 in place of a temperature value. In an example, a status, indicating that the substitute value 438 is not correct, may be provided with the substitute value 438.

Figure 4C:
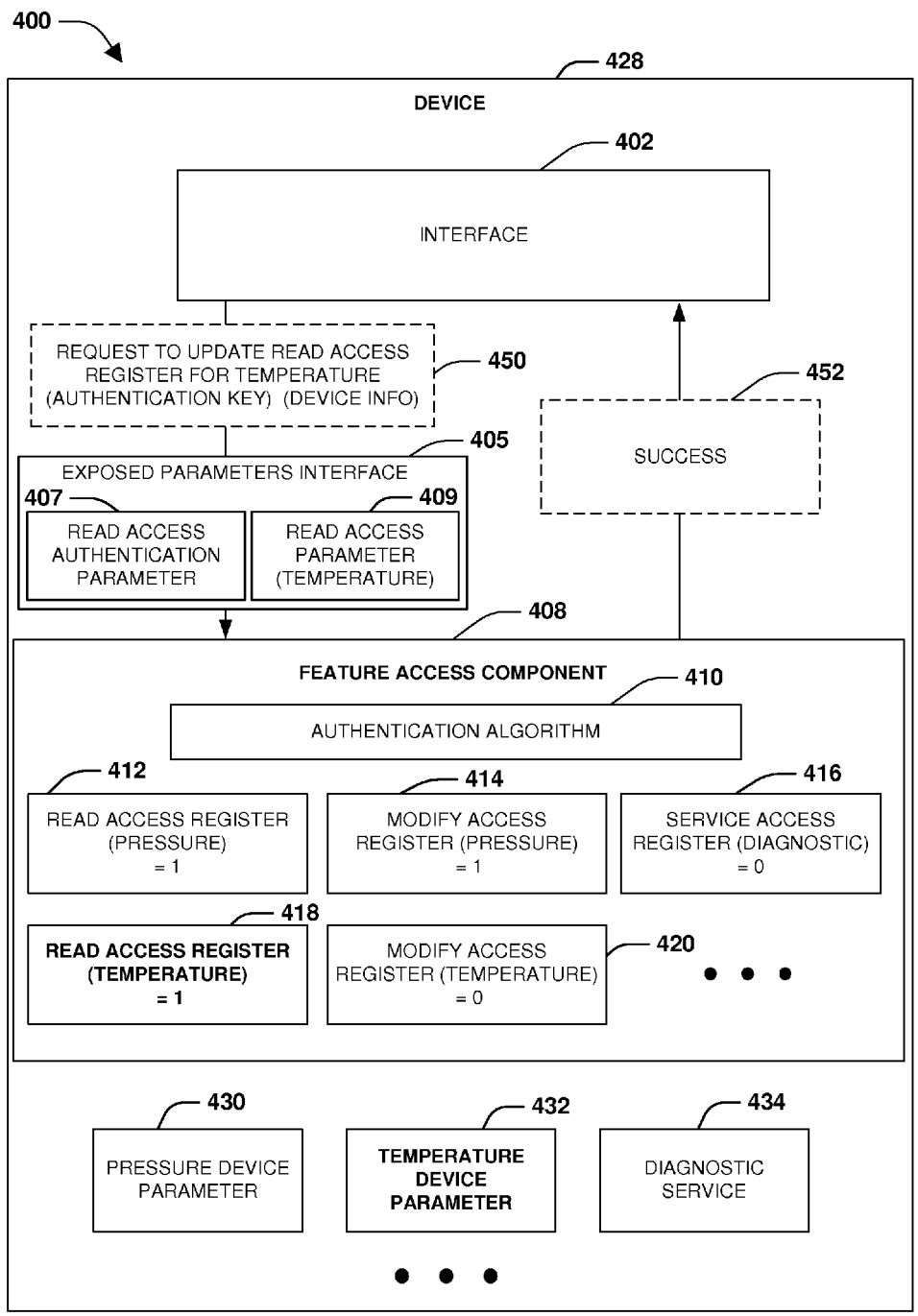
FIG. 4C is a schematic representation of an example of a system for controlling access to features of a device, where a read access control register is modified to indicate that a user has access to read a temperature device parameter.

Because the user may not have access to the temperature device parameter 432, the user may purchase an authentication key that may be used to enable read access to the temperature device parameter 432. FIG. 4C illustrates an example of receiving a request 450 to update the read access control register (temperature) 418 to enable read access to the temperature device parameter 432 (e.g., the request 450 may be received through the exposed parameter interface 405). The request 450 may include the authentication key specific to device identification information of the device 428. The exposed parameter interface 405 may set a read access authentication parameter 407 to the authentication key and may set a read access parameter (temperature) 409 to a value of 1 ("Enable") corresponding to a value to which the user may desire to write to the read access control parameter (temperature) of the read access control register (temperature) 418. The feature access component 408 may evaluate the read access authentication parameter 407 set to the authentication key, the read access parameter (pressure) 409 set to the value of 1 ("Enable"), and/or the device identification information using the authentication algorithm 410. Responsive to authenticating the request 450 (e.g., a signature or key verification may verify the authentication key) by validating the values within the read access authentication parameter 407 and the read access parameter (temperature) 409, the value of the read access control register (temperature) 418 may be changed from 0 ("Disable") to 1 ("Enable") based upon the read access parameter (temperature) 409 in order to indicate that the user has authorization to read the temperature device parameter 432.

Figure 4D:
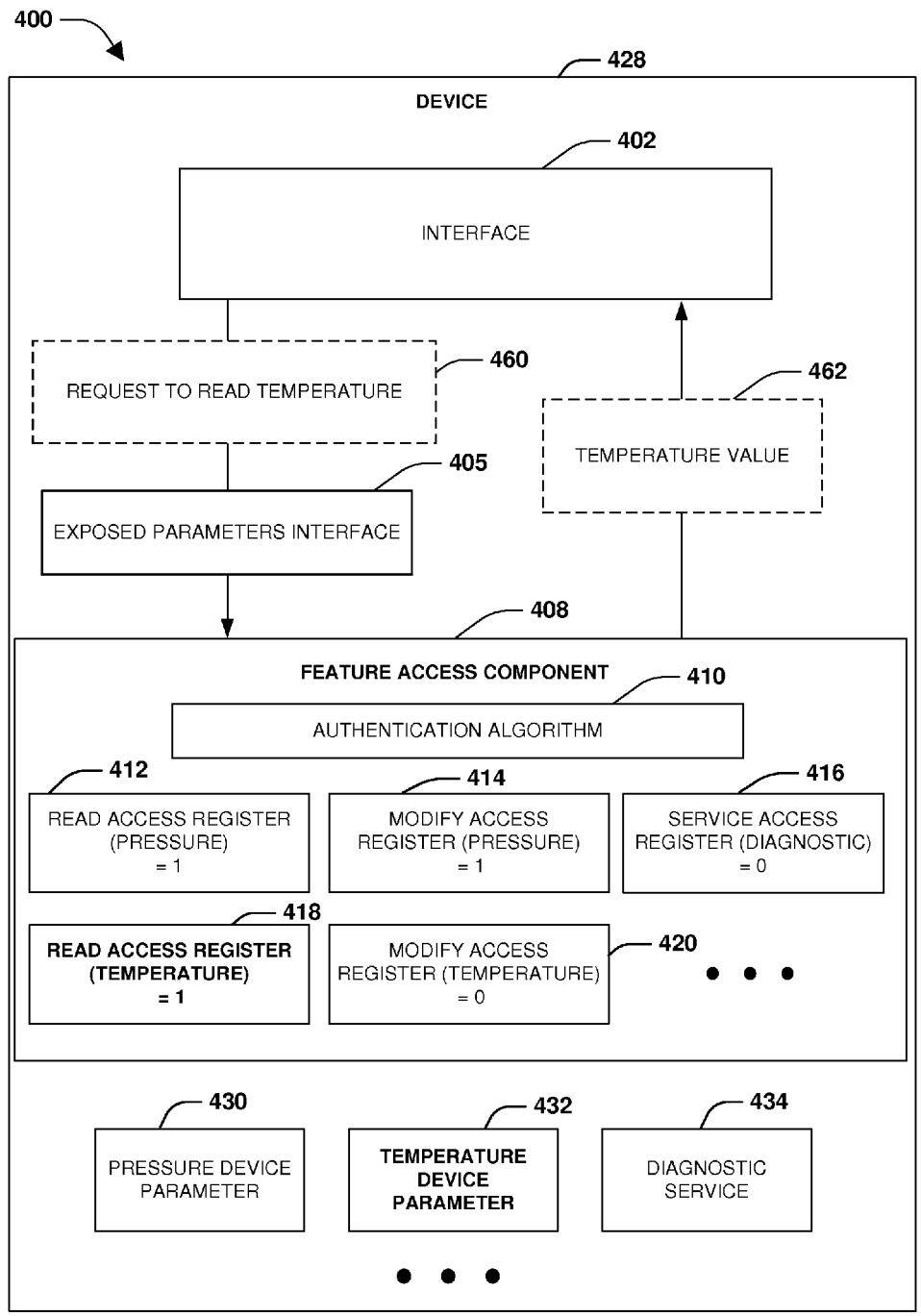
FIG. 4D is a schematic representation of an example of a system for controlling access to features of a device, where a temperature device parameter is read from the device.

FIG. 4D illustrates an example of receiving a request 460, to read the temperature device parameter 432, from the interface 402 (e.g., the request 460 may be received through the exposed parameter interface 405). The feature access component 408 may evaluate the read access control register (temperature) 418 to determine that a read access control parameter (temperature) (e.g., the updated value of 1 "Enable") indicates that the user has authorization to read the temperature device parameter 432. Accordingly, the device 428 may return a temperature value 462 of the temperature device parameter 432 to the user, such as through the feature access component 408 and/or the interface 402.

Figure 4E:
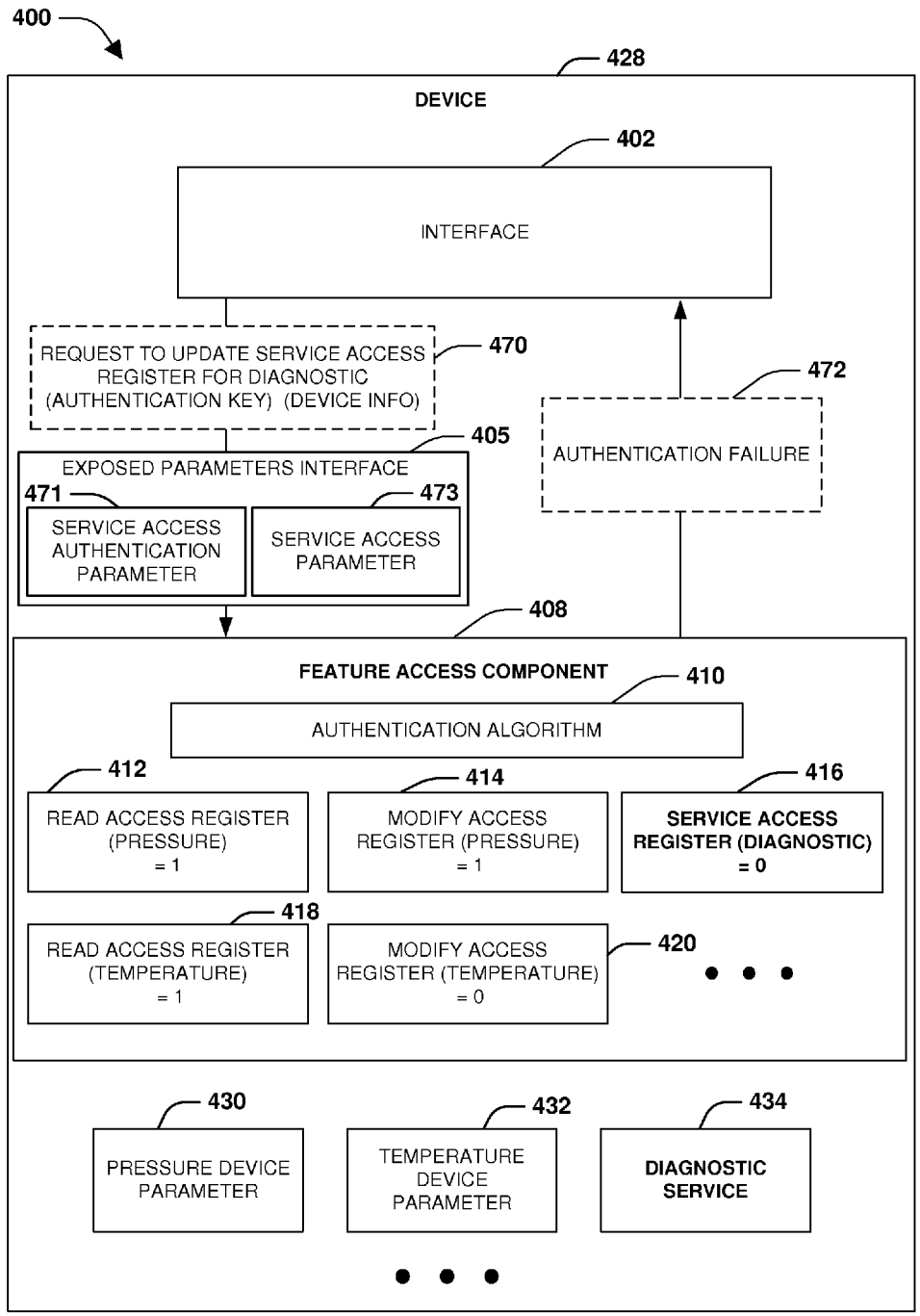
FIG. 4E is a schematic representation of an example of a system for controlling access to features of a device, where a service access control register is unsuccessfully modified and/or is disabled.

FIG. 4E illustrates an example of receiving a request 470 to update the service access control register (diagnostic) 416 to enable access to invoke the diagnostic service 434 (e.g., the request 470 be received through the exposed parameter interface 405). The request 470 may include an authentication key specific to device identification information of the device 428. The exposed parameter interface 405 may set a service access authentication parameter 471 to the authentication key and may set a service access parameter 473 to a value of 1 ("Enable") corresponding to a value to which the user may desire to write to the service access control parameter of the service access control register (diagnostic) 416. The feature access component 408 may evaluate the service access authentication parameter 471 set to the authentication key, the service access parameter 473 set to the value of 1 ("Enable"), and/or the device identification information using the authentication algorithm 410. Responsive to not authenticating the request 470 (e.g., a signature or key verification may not verify the authentication key because the authentication key does not correspond to an ability to enable access to invoke the diagnostic service 434), the value of the service access control parameter, stored within the service access control register (diagnostic) 416, may remain at 0 ("Disable") in order to indicate that the user does not authorization to invoke the diagnostic service 434 and/or that the service access control register (diagnostic) 416 is disabled.

Figure 4F:
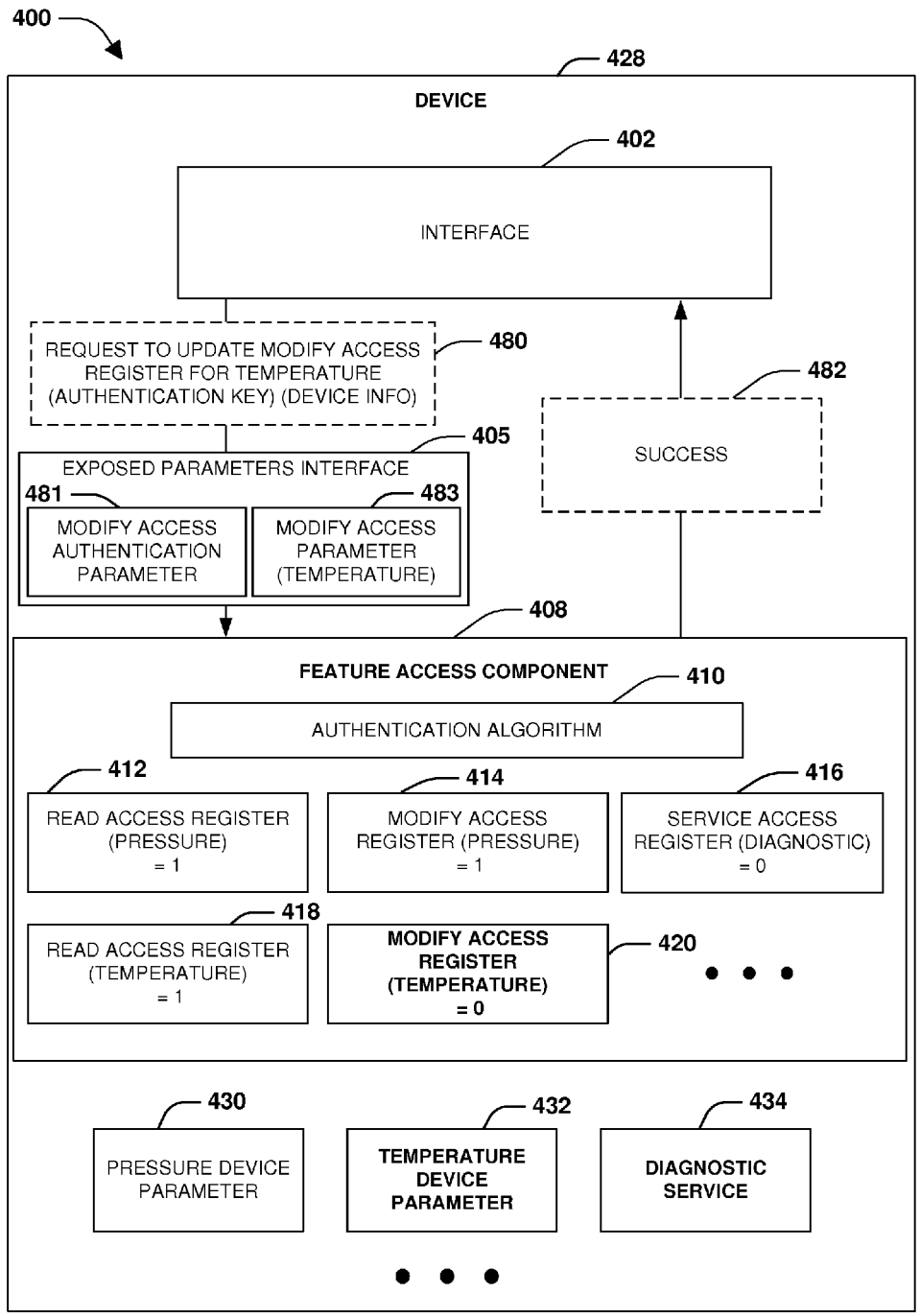
FIG. 4F is a schematic representation of an example of a system for controlling access to features of a device, where a modify access control register is modified to indicate that a user has access to modify a temperature device parameter.

FIG. 4F illustrates an example of receiving a request 480 to update the modify access control register (temperature) 420 to enable modify access to the temperature device parameter 432 (e.g., the request 480 may be received through the exposed parameter interface 405). The request 480 may include an authentication key specific to device identification information of the device 428 (e.g., the user may purchase a new authentication key used to enable modification of the temperature device parameter 432). The exposed parameter interface 405 may set a modify access authentication parameter 481 to the authentication key and may set a modify access parameter (temperature) 483 to a value of 1 ("Enable") corresponding to a value to which the user may desire to write to a modify access control parameter (temperature) of the modify access control register (temperature) 420. The feature access component 408 may evaluate the modify access authentication parameter 481 set to the authentication key, the modify access parameter (temperature) 483 set to the value of 1 ("Enable"), and/or the device identification information using the authentication algorithm 410. Responsive to authenticating the request 480 (e.g., a signature or key verification may verify the authentication key) by validating the values within the modify access authentication parameter 481 and the modify access parameter (temperature) 483, the value of the modify access control register (temperature) 420 may be changed from 0 ("Disable") to 1 ("Enable") in order to indicate that the user has authorization to modify the temperature device parameter 432.

Figure 5:
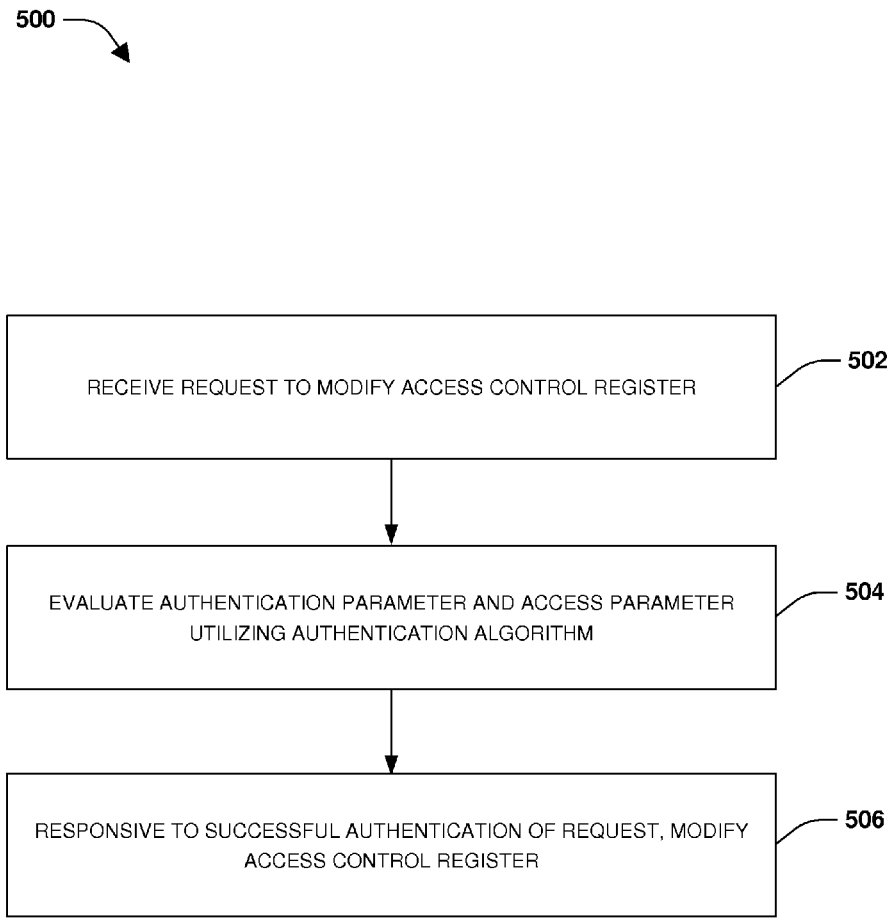
FIG. 5 is a flow chart for an example method of controlling access to features of a device.

FIG. 5 illustrates an example method 500 of controlling access to features of a device. The method 500 is exemplary only and can be changed by, for example, adding, removing, altering, and/or rearranging stages.

Stage 502 can include receiving a request to modify an access control register to enable or disable access to a feature of a device (e.g., modification of a read access control parameter of a read access control register, a modify access control parameter of a modify access control register, a service access control parameter of a service access control register, etc.). For example, a user, such as an owner of the device, may send a signal, comprising the request, from a computer or any other device, over a communication line, to the device. The request can include an authentication key used to set an access authentication parameter and a value used to set an access parameter. For example, the authentication key may have been purchased by the user to enable additional features of the device not already available to the user.

Stage 504 can include evaluating the access authentication parameter and the access parameter utilizing an authentication algorithm for either authenticating the request or not authenticating the request. For example, the request may comprise a value used to set a read access parameter to a 1 ("Enable") value for gaining access to read pressure information from the device (e.g., the read access parameter and a corresponding read access control register may previously have been set to a 0 ("Disable") value to indicate that the user did not have access to read the pressure information). The authentication algorithm may evaluate the access authentication parameter, set to the authentication key from the request, to determine whether the authentication key is genuine and provides authorization to access the read pressure information.

Stage 506 can include, responsive to successfully authenticating the request, modifying the access control register, such as the read access control register for the pressure information, based upon the value of the access parameter to enable or disable the feature. For example, if the authentication algorithm determines that the authentication key is genuine and provides authorization to access the read pressure information, then the read access parameter, having the 1 ("Enable") value, is written to the read access control register whose value indicates whether requests to access the read pressure information will be allowed or denied. If the read access parameter, having the 1 ("Enable") value, is written to the read access control register, then subsequent requests to access the read pressure information will be allowed.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof. "At least one of element A, element B, and element C" is not intended to be limited to at least one of an element A, at least one of an element B, and at least one of an element C.

The disclosed subject matter has been presented with reference to the example embodiments described above. Modifications and alterations will occur to others upon a reading and understanding of this specification

What is claimed is:

1. A computing device for controlling access to features of a device, the computing device comprising:
    a valve assembly with a valve that opens and closes to regulate flow of fluid,
    a processor disposed on the valve assembly and the processor configured to:
        exchange signals with a control system, the signals including a process parameter that relates to a process on a process line, a control signal that instructs the processor to operate the valve assembly in response to the process parameter, and a request to access values within an access control register accessible to the processor and storing an access control parameter indicating whether a user has access to a feature of the valve assembly, the request comprising an authentication key used to set an access authentication parameter and a value used to set an access parameter;
        evaluate the authentication key and the access authentication parameter utilizing an authentication algorithm to determine whether the request is authenticated; and
        responsive to the authentication key and the access authentication parameter allowing the authentication algorithm to successfully authenticate the request, access plural registers on the valve assembly that serve to separately maintain a read access register and a modify access register for operating parameters for the valve assembly, and a service access register for service parameters for the valve assembly; and
        modify one of the read access control register, the modify access register, or the service access register based upon the value of the access parameter to change the feature of the valve assembly.

2. The computing device of claim 1, the feature corresponding to at least one of a service and a device parameter.

3. The computing device of claim 1, the access control register including a read access control register that includes a read access control parameter indicating whether the user has access to read a device parameter.

4. The computing device of claim 1, the access control register including a modify access control register that includes a modify access control parameter indicating whether the user has access to modify a device parameter.

5. The computing device of claim 1, the access control register including a service access control register that includes a service access control parameter indicating whether the user has access to invoke a service.

6. The computing device of claim 1, the processor being further configured to:
    responsive to the authentication key and the access authentication parameter allowing the authentication algorithm to not successfully authenticate the request to modify a read access control parameter, provide a substitute value to the user.

7. The computing device of claim 6, the processor being further configured to:
    provide a status with the substitute value that the substitute value is not correct.

8. The computing device of claim 1, the request including device identifying information, and the processor being further configured to:
    evaluate the device identifying information utilizing the authentication algorithm to determine whether the request is authenticated.

9. The computing device of claim 8, the processor being further configured to:
    responsive the authentication key and the access authentication parameter allowing the authentication algorithm to successfully authenticate the request, modify the access control register for a device instance of the device based upon the device identifying information specifying the device instance.

10. The computing device of claim 8, the processor being further configured to:
    responsive to the authentication key and the access authentication parameter allowing the authentication algorithm to successfully authenticate the request, modify the access control register for devices of a device manufacturer of the device based upon the device identifying information specifying the device manufacturer.

11. The computing device of claim 8, the processor being further configured to:
    responsive to the authentication key and the access authentication parameter allowing the authentication algorithm to successfully authenticate the request, modify the access control register for devices of a device type of the device based upon the device identifying information specifying the device type.

12. The computing device of claim 8, the processor being further configured to:
    responsive to the authentication key and the access authentication parameter allowing the authentication algorithm to successfully authenticate the request, modify the access control register for devices of a device purchase order including the device based upon the device identifying information specifying the device purchase order.

13. The computing device of claim 1, the processor being further configured to:
    receive the request through a field bus interface.

14. The computing device of claim 1, the processor being further configured to:
    receive the request through a local user interface of the device.

* * * * *